(12) United States Patent
Bruck et al.

(10) Patent No.: US 11,036,762 B1
(45) Date of Patent: Jun. 15, 2021

(54) COMPOUND PARTITION AND CLUSTERING KEYS

(71) Applicant: Amazon Technologies, Inc., Seattle, WA (US)

(72) Inventors: Lewis Bruck, Bothell, WA (US); Aishwarya Kamal, Redmond, WA (US); Almero Gouws, Seattle, WA (US); Derek William Richard Chen-Becker, Centennial, CO (US); Haifeng He, Bellevue, WA (US); Andrey Markin, Seattle, WA (US); Akshat Vig, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 16/698,417

(22) Filed: Nov. 27, 2019

(51) Int. Cl.
| | |
|---|---|
| *G06F 16/00* | (2019.01) |
| *G06F 16/27* | (2019.01) |
| *G06F 21/62* | (2013.01) |
| *G06F 16/25* | (2019.01) |
| *G06F 16/28* | (2019.01) |

(52) U.S. Cl.
CPC .......... *G06F 16/278* (2019.01); *G06F 16/258* (2019.01); *G06F 16/285* (2019.01); *G06F 21/6227* (2013.01)

(58) Field of Classification Search
CPC ..... G06F 16/278; G06F 16/285; G06F 16/258
See application file for complete search history.

(56) References Cited

U.S. PATENT DOCUMENTS

| | | | |
|---|---|---|---|
| 8,849,825 B1 * | 9/2014 | McHugh | G06F 16/2255 707/737 |
| 2018/0246934 A1 * | 8/2018 | Arye | G06F 16/27 |
| 2019/0005045 A1 * | 1/2019 | Natal | G06F 16/2282 |
| 2020/0004851 A1 * | 1/2020 | Lambov | G06F 16/2255 |

* cited by examiner

*Primary Examiner* — Khanh B Pham
(74) *Attorney, Agent, or Firm* — Davis Wright Tremaine LLP

(57) ABSTRACT

A data storage service implements encoding techniques for generating compound partition keys, compound clustering keys, or a combination for more flexibility in storing data in a key-value database system. In some aspects a request to store data with multiple partition keys and/or multiple clustering keys may be received. Length information may be added to the partition keys, and the results concatenated together to form a compound partition key used to store the data in the database. Ordering information may be added to the clustering keys, and the results concatenated together to form a compound clustering key, to be used in storing and sorting data in the database. In some cases, the clustering keys may be made a uniform length, such as by padding keys, as necessary, to have a length that is a multiple of an arbitrary number, and then dividing the clustering keys into chunks of that arbitrary number.

20 Claims, 10 Drawing Sheets

COMPOUND PARTITION AND CLUSTERING KEYS

BACKGROUND

Distributed database systems may be called upon to provide scalable and reliable access to data. In some distributed database systems, the system maintains data on a cluster of servers or nodes and replicates data between the nodes. In some cases, the nodes may be associated with different geographical regions. Such a distributed database system may utilize a key-value based approach to storing data to provide increased scalability and reliability compared to some systems, such as fully relational or table-oriented databases. However, these key-value base systems may lack functionality when compared to other, more complex, relational database systems, such as the ability to more granularly determine where to store certain data and ordering of the data.

BRIEF DESCRIPTION OF THE DRAWINGS

Various techniques will be described with reference to the drawings, in which.

DETAILED DESCRIPTION

Figure 1:
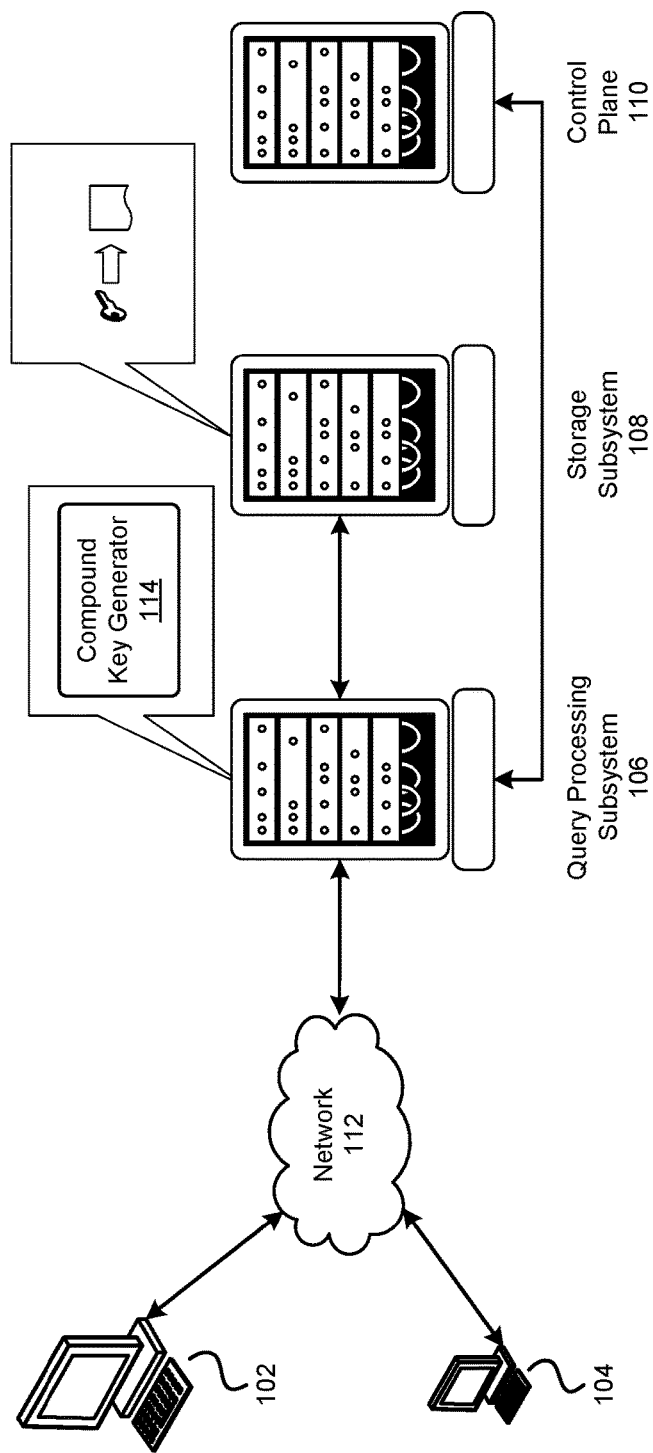
FIG. 1 illustrates an example distributed database system, in accordance with at least one embodiment.

Systems and methods are described herein for utilizing compound partition keys, clustering keys, or a combination thereof to more flexibly control storage and access to data stored by a key-value database. In an example, a distributed database system may store client data on a number of storage node according to key-value pairs or other similar key-value convention. In order to facilitate more granular control of the storage and other operations on the data, such as those operations typically provided by table-oriented or even relational databases, the data may be stored according to a compound partition key, a compound clustering key, or a combination of both. Specific encoding of compound partition and clustering keys may be implemented by a front end host or system that is part of or interacts with the distributed database system. The actual storage nodes of the database system may operate as normal, as if data was being stored according to convention key-value schemes.

Some key value pair based data storage systems may allow only one partition or hash key to be specified per data table, where the partition key is used to determine on what node to store the data table. This may limit the control over which data may be distributed across different nodes in a data storage system. A compound partition key may be generated by combining two or more partitions keys, to specify more than one column of data in a data table by which to select a node to store the data table on. This may enable more precise control of what data is stored at the same or different nodes. A compound partition key may be generated using a new encoding scheme that allows composite partition key values to be hashed together in order to maintain a single hash key internally while allowing a significant increase in the number of user-specified hash keys. In one example, a compound partition key may be generated by converting at least two partition key values to binary format. Length information, indicating the length of the individual binary partition keys, may be appended to the binary partition keys, and the modified binary partition keys, with length information, may be concatenated together. The result, a compound partition key may then be hashed and used as a key to store the associated data table in the database system.

Clustering keys may be used to specify a sort order of the data within a data table, such as alphabetical (by column), reverse alphabetical, and so on. Some key-value based databases may only enable sorting data in a data table according to one clustering key. Compound clustering keys may be used to facilitate more specific and multi-factor or mixed key sorting of data. To implement mixed key sort order, a new encoding scheme may be implemented that allows an increase in the number of range keys while accommodating variable length binary values. In one example, the encoding utilizes a chunked format that uses a suffix byte on each chunk to either indicate further chunks or to indicate the length of the terminal chunk. This encoding maintains a stable sort order for both fixed length and variable length data. Complement encoding is defined for all field types, including the chunked encoding, so that descending order can be represented for any combination of clustering or range key values.

In one example, clustering keys may be received that may be of differing lengths. One or more of the clustering keys may be padded to change the length to a multiple of an arbitrary number. The clustering keys may then be divided into chunks, of a length equal to the arbitrary number. Next, metadata in the form of ordering data may be added to the chunks, to maintain the correct order of the keys. The ordered chunks may then be concatenated together to produce a compound clustering key used to store the associated data table in the database system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to more precise control over storage and access to data stored in a key-value based database. More specifically, the described system and techniques may provide for faster access to data and more efficient storage and retrieval of data in a key-value based database that supports more complex operations of a table-oriented or relational database system, without the overhead of those more complex database systems. In addition, the described techniques may provide for table-oriented functionality supported by a key-value database system. In some aspects, the scope of the changes to implement compound partition and clustering keys with key-value databases systems is limited to the front end, and may not significantly impact the storage layer, thus enabling widespread integration with existing key-value based database systems.

FIG. 1 illustrates an example distributed database system, in accordance with at least one embodiment. In the example of FIG. 1, a distributed database system 100 is a multi-tenant database system, capable of storing data on behalf of a plurality of clients 102, 104. The distributed database system 100 may be described as multi-tenant because data maintained by the system 100 on behalf of one client 102 is not generally visible to another client 104.

In the example of FIG. 1, the distributed database system 100 comprises a query processing subsystem 106, storage subsystem 108, and control plane 110. In some aspects, one or more aspects of the database system 100 may be provided by system 1000 described in greater detail below in reference to FIG. 10.

A client 102, 104 may comprise a computing device, computing process, hosted computing service, and so forth. A client, as used herein, generally refers to a client device associated with a particular entity, such as a customer of a hosted distributed database service.

In at least one embodiment of the depicted system 100, interaction between a client 102, 104 and the distributed database system 100 is performed using an interaction protocol that defines a format for exchanging messages between a client 102, 104 and the distributed database system 100. A client 102, 104 may comprise a driver module, or other software, that implements an interaction protocol. Clients 102, 104 may communicate with the distributed database system 100 via a network 112, e.g. by transmitting messages via an interaction protocol to a front-end system, such as to a node or other element of a query processing subsystem 106.

In the example of FIG. 1, query processing subsystem 106 comprises one to a plurality of front-end nodes, which may also be described as front-end peers, query processing peers, or as peers. In at least one embodiment of the depicted system 100, front-end nodes are added to or removed from the query processing subsystem 106 to scale according to demands on capacity or utilization.

In at least one embodiment of the depicted system 100, query processing subsystem 106 provides table-oriented access to data maintained by the distributed database system 100. Table-oriented, or tabular, access refers, in part, to the data being accessed in terms of tables, e.g., as rows and columns of table.

In at least one embodiment of the depicted system 100, query processing subsystem 106 provides access to data specified in terms of a table-oriented query language, such as structured query language ("SQL") or Cassandra query language ("CQL"). In at least one embodiment of the depicted system 100, access to data is table-oriented but non-relational. As such, a query language supported by the query processing subsystem 106 may be a subset of a relational query language, such as SQL.

In at least one embodiment of the depicted system 100, query processing subsystem 106 comprises a query parser and query planner. When a query is received from a client 102, 104, the query parser analyzes the query, identifies the query's constituent keywords and clauses, and determines the query's meaning. The query planner then formulates a plan for executing the query. In at least one embodiment of the depicted system 100, the query processing subsystem 106 then executes the query plan.

In at least one embodiment of the depicted system 100, each node of the query processing subsystem 106 is independently capable of performing the aforementioned functions of the query parser and query planner, and of executing the generated query plan. In at least one embodiment of the depicted system 100, execution of a generated query plan comprises interaction with one or more storage nodes of a storage subsystem 108.

In the example of FIG. 1, storage subsystem 108 comprises a plurality of storage nodes, which may also be described as storage peers, or as peers. The term peer may also be used to refer to a combination of one or more query processing peers and one or more storage peers. In at least one embodiment of the depicted system 100, storage nodes are added to or removed from the storage subsystem 108 to scale according to demands on capacity or utilization.

In at least one embodiment of the depicted system 100, the storage subsystem 108 operates as a key-value, non-relational data store. The storage subsystem 108, in at least one embodiment of the depicted distributed database system 100, is a key-value or key-to-values data store having comparatively high scaling properties, but comparatively limited query capabilities. For example, while embodiments of the query processing subsystem 106 may provide support for SQL or CQL queries, embodiments of the storage subsystem may instead support comparatively primitive operations which store and retrieve individual values, or collections of values, based on a key value. The storage subsystem 108 may, in some embodiments, provide limited support for range queries, e.g. by providing for the retrieval of values, or collections of values, associated with a range of key values. In at least one embodiment of the depicted distributed database system 100, these limitations allow the system 100 to be highly scalable, and to facilitate implementation of a range of replication models and approaches to multi-tenancy.

In some implementations, the storage subsystem 108 may natively support a single partition or hash key for determining where (e.g., in what node or nodes) of the storage subsystem 108 to store a user table, and a single clustering key per user table used to sort or order the various items or rows in the user table. This may be implemented as being mapped to a primary index with the hash key or a hash key and a clustering key. As described herein, compound partition keys and/or compound clustering keys may be introduced and encoded in a way that doesn't change, at all or at least significantly, the underlying storage structure of the storage subsystem 108. In some implementations, the compound partition key may support or include two to four, or more partition keys per table up to a length of 2048 bytes per key, as supported by current key-value database systems, encoded to work with existing database systems (e.g., having a hashed length of binary 16). In some cases, the compound clustering key may support or include two to ten, or more clustering keys per table encoded to work with existing database systems, and may include a variable length binary value (e.g., up to 1024 bytes) divided into chunks that supports mixed sort order (e.g., ascending and descending in the same table), as will be described in greater detail below. It should be appreciated that the above sizes and limits are only given by way of a specific example, other lengths, limits, etc., may be implemented to adapt the described systems and techniques to work with other key-value and other based database systems.

To implement compound partition and clustering keys, the query processing subsystem 106 may include or provide a compound key generator 114, which may convert and combine multiple partitions keys into a compound partition key, and/or multiple clustering keys into a compound clustering key, which may be used to store and retrieve the client provided data in and from one or more storage nodes of storage subsystem 108. The compound key generator 114 may facilitate more complex table-oriented or relation database operations on data stored in a key-value database, by enabling more precise specification of partition keys and/or clustering or range keys. The storage subsystem 108 may, using the compound partition and/or clustering keys, store the data on one or more storage nodes according to the provided keys.

In some aspects, to support compound partition keys and compound clustering keys, the storage subsystem 108 may relax or expand key size limits and have access to the particular encoding scheme used to generate the compound keys. In some aspects, generation of the compound keys may primarily or exclusively performed by the front end or query processing subsystem 106. The actual keys, and the encoding scheme may be stored by the storage subsystem 108 and accessed as needed, by the query processing subsystem 106 and storage subsystem 108. In some aspects, the query processing subsystem 106 may send the keys to the storage subsystem 108 in order to store or access the underlying data. In yet some cases, the individual keys may be sent to the storage subsystem 108, which may generate the compound partition and/or clustering keys, using a similar structure/process as utilized by the compound key generator 114 and will be described in greater detail below. In yet some cases, both the query processing subsystem 106 and the storage subsystem 108 may support generating compound keys, and may be utilized as needed or based on a number of other considerations.

In at least one embodiment of the depicted system 100, a control plane 110 facilitates scaling the capacity of the query processing subsystem 106. The control plane 110 may, for example, monitor actual or forecast capacity utilization of the query processing subsystem 106 and add or remove query processing nodes accordingly. In at least one embodiment of the depicted system 100, a control plane 110 facilitates scaling the capacity of the storage subsystem 108. The control plane 110 may, for example, monitor actual or forecast capacity utilization of the storage subsystem 108 and add or remove storage nodes to the subsystem.

In at least one embodiment of the depicted system 100, the control plane 110 facilitates management of capacity utilization by respective clients 102, 104. For example, the control plane 110 may monitor capacity utilization by clients 102, 104 and determine allocations of partitions among storage nodes of the storage subsystem 108. Similarly, the control plane 110 may determine how many and which query processing nodes the clients 102, 104 should have access to.

In some aspects, the described techniques may provide for one or more advantages or benefits over adopting a fulling relation based storage system, including the ability to utilize more scalable key-value database systems, greater ability to expand and support larger key sizes, and/or the ability to use smaller page sizes optimized for quicker access to the data (e.g., MSQL 8.0 expands page size from 16 KB to 64 KB, thus placing utilizing more resources for access the data).

Figure 2:
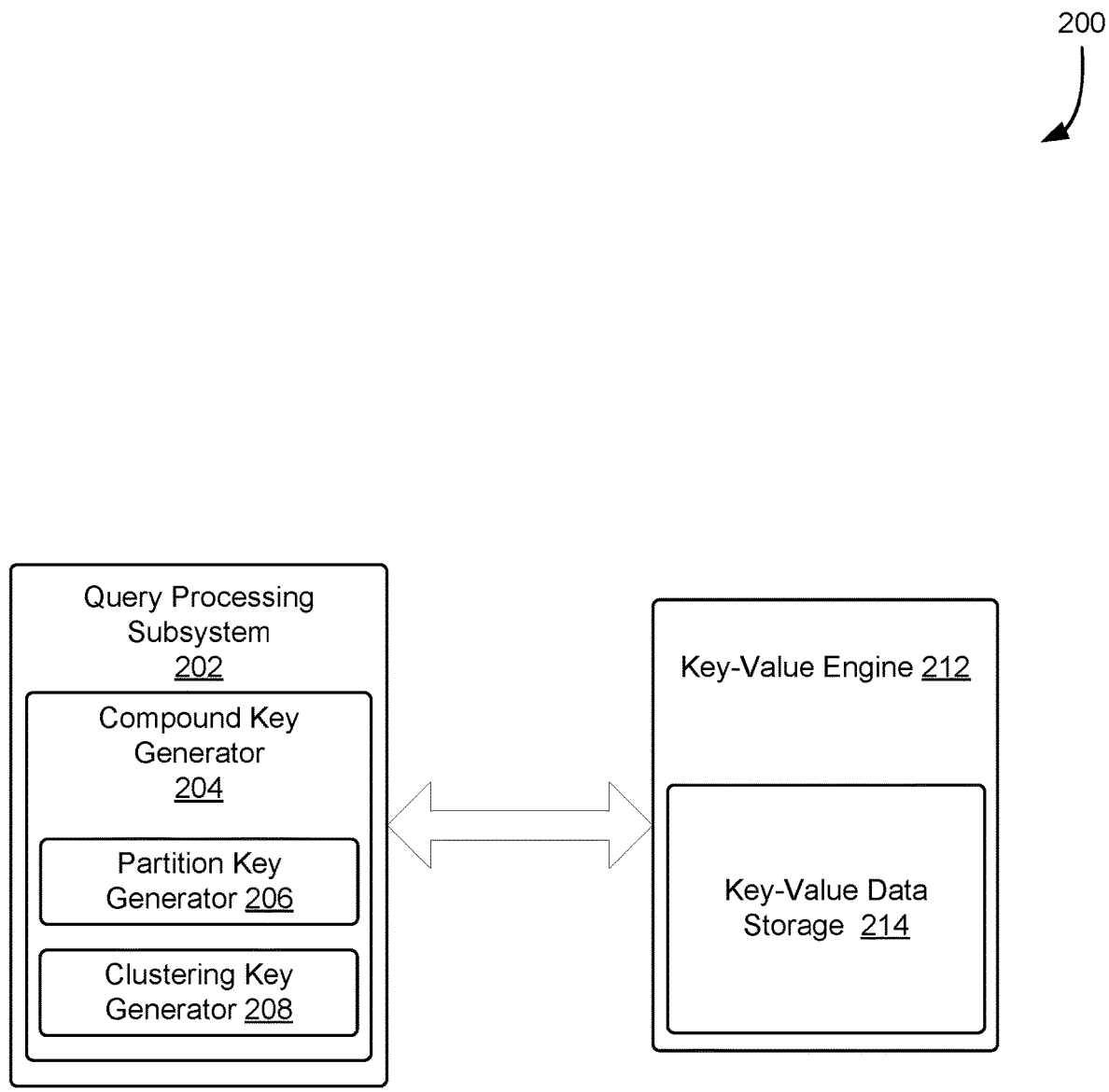
FIG. 2 illustrates another example distributed database system, in accordance with at least one embodiment.

FIG. 2 illustrates another example distributed database system 200, in accordance with at least one embodiment. As illustrated in FIG. 2, a query processing subsystem 202 may interact with a key-value engine 212. In some aspects, query processing subsystem 202 may include one or more aspects of query processing subsystem 106 described above in reference to FIG. 1. The query processing subsystem 202 may be a component of a front end system or host and may interact with a key-value engine 212, which may manage and store data in using a key-value scheme. In some cases, key-value engine 212 may be part of or operate in conjunction with storage subsystem 108 and/or control plane 110, as described in connection with FIG. 1. In some aspects, one or more aspects of the system 200 may be provided by system 1000 described in greater detail below in reference to FIG. 10.

The key-value engine 212 may manage items stored in a database system. In various embodiments, the key-value engine 212 may utilize the key-value data storage 214, which may be a data store, object, and/or database that may manage items stored in the database system. The items stored in the database system may be structured according to various policies, and may not be defined by a particular schema. The items may be identifiable through a key value pair identifier, which may indicate the location and/or various other characteristics of the items. For example, an item may be stored in the database system, and may be identifiable by a single identifier, which may be a number, character, and/or variations thereof.

For example, one or more processes may cause the query processing subsystem 202 to receive a request to store a table comprising various data objects, in which the table is structured according to a defined schema. The request may be formatted in a query language. The query processing subsystem 202 may store the various data objects in a different database system, which may be structured according to various policies. The different database system may utilize the key-value engine 212 and may store data objects according to key-value pair identifiers, in which each data object may be identifiable by an identifier.

The query processing subsystem 202 may include a compound key generator 204, which may include one or more aspects of compound key generator 114 described above in reference to FIG. 1. The compound key generator 204 may include a partition key generator 206 and a clustering or range key generator 208, which may each be a process or set of instructions executed by the query processing subsystem 202. In some examples, the partition key generator 206 may obtain or receive two or more partitions keys associated with data to be stored in a key-value data store 214, such as by key-value engine 212. The partition key generator 206 may modify the partition keys to include information indicating the length of the individual partition keys (e.g., how many bits/bytes). The partition key generator 206 may further combine the modified partition keys and generate a hash of the combined partition key, to be used as a key to store associated data by the key-value engine 212. The key-value engine 212 may then select one or more nodes upon which to store the data associated with the generated compound partition key, such as according to the two or more partition keys, which may indicate certain columns in a data table, to be stored. For example, the compound partition key may specify last name as a first column to be used as a first partition key, and a state as a second column to be used as a second partition key. The key-value engine 212 may store data in specific nodes of the key-value data storage 214 based on the hash of the combined partition value based on those two columns within the data.

The clustering key generator 208 may receive one or more clustering keys associated with data to be stored in a key-value data store 214, such as by key-value engine 212. In some examples, the clustering key generator 208 may obtain or receive two or more clustering keys used to sort or order data in a table. In some aspects, the clustering key generator 208 may pad one or more of the clustering keys so that the length of each of the clustering keys is a multiple of an arbitrary number. In one example, the arbitrary number may be selected from 1 to 255. Next, the clustering key generator 208 may separate the keys into chunks of a uniform or pre-selected length, such as the length, in bytes, of the arbitrary number. The chunks may then be appended with ordering information, such as may indicate one or more of starting chunk, ending chunk, number of non-padded chunks, etc. In some aspects, the ordering information of metadata may distinguish between the ending chunk and the rest of the chunks that are not the ending chunk. The ordered chunks may then be concatenated or combined together and a hash of the compound key generated. The key-value engine 212 may then store the associated data in the key-value data storage 214 in the order specified by the hash of compound partition key.

In some cases, implementing the compound partition key and compound clustering key generation and processing requests including compound keys on the front end or query processing subsystem 202 may enable more efficient and streamline adaptation of the described systems to existing database systems. In some cases, this may include storing raw attribute names and values for each clustering key on disk to be utilized by other services, such as to backup and restore the data, etc. This may, in some cases, include duplicating the data for clustering keys on disk.

In some aspects, conditional expressions involving keys may be evaluated by the front end or query processing subsystem 202/compound key generator 204. In some cases, such as to update an item, a two phase protocol may be implemented, where a request to update a non-existent item turns into an insert operation on storage node of the key-value data storage 214 based on the result of reading the item from key-value data storage 214. For encoded keys, a two-phase protocol may enable the front end or query processing subsystem 202/compound key generator 204 to perform a read followed by a write to atomically update the item.

The fundamental unit of representation of an attribute in an item may include an attribute name, attribute value and attribute type. For encoded keys that a storage node of the key-value data storage 214 does not fully understand, a special attribute name, to associate with the encoded keys for all processing on the storage node, may be added or implemented.

Figure 3:
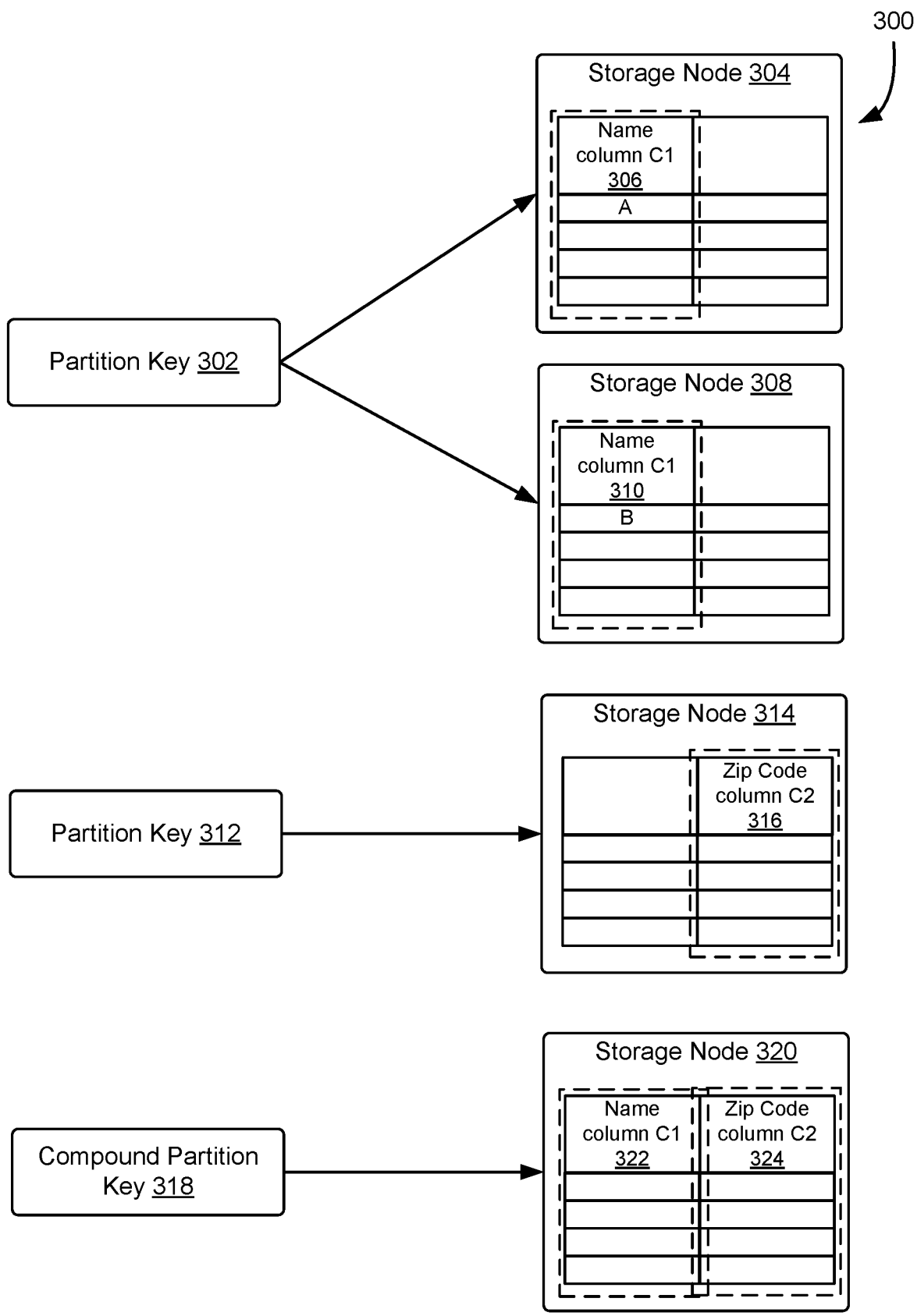
FIG. 3 illustrates an example of a compound partition key, in accordance with at least one embodiment.

FIG. 3 illustrates examples 300 of single and compound partition keys, in accordance with at least one embodiment. As illustrated, single partition keys 302 and 312 may specify a single column for determining which node to store a data table on, such as a node in a storage subsystem 108 and/or key-value data store 214 described above. In the illustrated example, partition key 302 specifies different ranges of a column C1 which may define a name, with node 304 storing names 306 starting with the letter A and node 308 storing names 310 starting with the letter B and so on. Another partition key 312 may designate to store data according to a different column, such as zip code column 316, in node 314. In some examples, single partition keys may be useful for storing larges amount across a number of nodes, such as where data is evenly distributed across the range of stored partition key values.

In some cases, however, it may be desirable, for a number of reasons to have the ability to specify a compound partition key, to for example store data that will be retrieved together in the same node, to distribute data more evenly across a number of nodes, etc. A compound partition key may specify two or more columns or values by which to categorize and store different data in different storage nodes. For example, a compound partition key 318 may specify that data is to be stored in different nodes, such as node 320, based on the combination of name 322 and zip code 324. In some cases, different orders may be specified, such that, for example zip code 324 is the first value to sort, followed by name. This may be desirable to group, and thus retrieve more quickly, names organized by zip code first. The described systems and techniques enable a client or user to specify a compound partition key, and use that compound partition key to store and access data stored in key-value based database, where such control would not otherwise be possible. This may be done with little to no change to the existing structure of the storage nodes and database system itself.

The specific compound partition key described above is only given by way of example. It should be appreciated that various other combinations of values, columns, number of keys, formats of keys, etc. are contemplated herein, as will be described in greater detail below.

Figure 4:
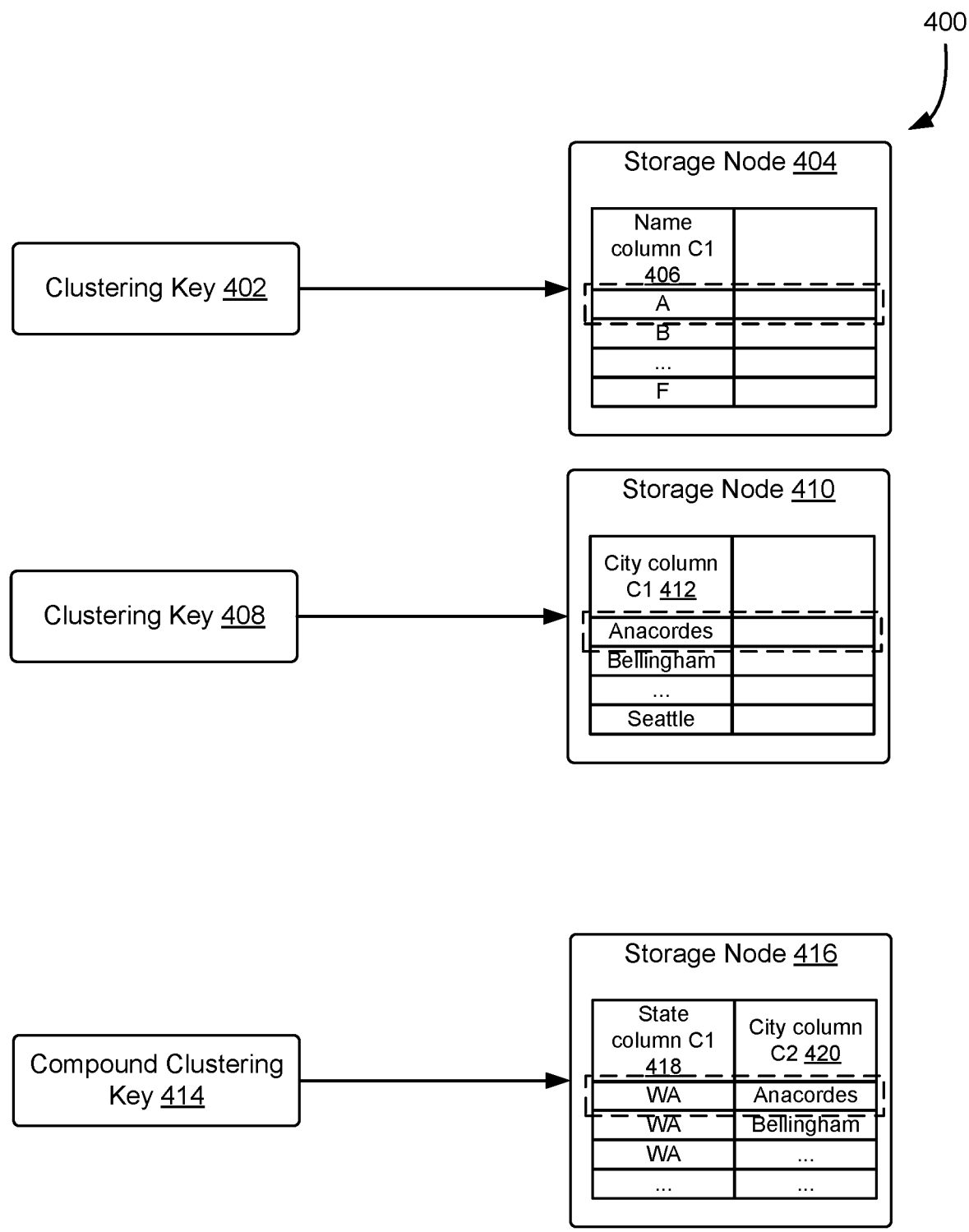
FIG. 4 illustrates an example of a compound clustering key, in accordance with at least one embodiment.

FIG. 4 illustrates examples 400 of single and compound clustering keys, in accordance with at least one embodiment. A single clustering key may be used to sort and retrieve data within and from a partition based on a column or other attribute of the data in the partition, such as may be stored by a data storage system or database, as described herein. For example, a single clustering key 402 may sort data in a partition stored on node 404 ordered by name 406. Another clustering key 408 may sort data in a partition on a node 410 ordered by city 412.

In some cases, it may be beneficial to specify multiple clustering or range keys to enable more precise sorting and retrieval of data, such as may be provided by the described systems and techniques. For example, compound clustering key 414 may be used to sort and retrieve data in a partition on node 416 by state 418 and by city 420, in either order, as may be specified by the compound clustering key.

The specific compound clustering key described above is only given by way of example. It should be appreciated that various other combinations of values, columns, number of keys, formats of keys, etc. are contemplated herein, as will be described in greater detail below.

Figure 5:
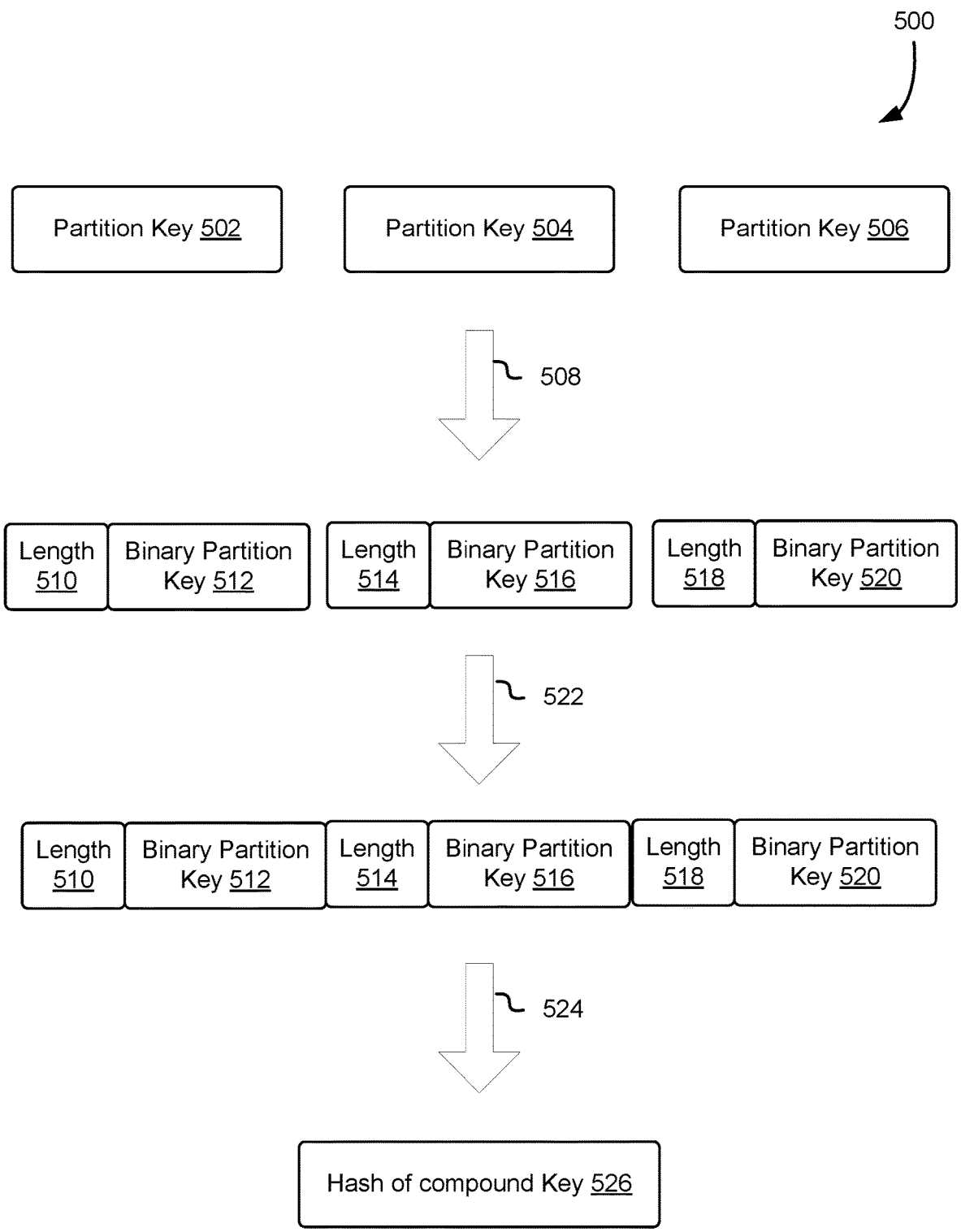
FIG. 5 illustrates an example process of generating a compound partition key, in accordance with at least one embodiment.

FIG. 5 illustrates an example process 500 of generating a compound partition key, in accordance with at least one embodiment. Process 500 may be performed by compound key generator 114 or partition key generator 206 as described above in reference to FIGS. 1 and 2, and/or may include two or more partition keys, as described above in reference to FIG. 3.

Each input partition key may go through a two or multi-step procedure for encoding. The first step may include encoding the given partition key value, which may alpha-numeric, to a binary representation, for example, using existing encoding schemes for scalar types. The second primary step may include prepending the encoded value with length information. In some examples, the length information may be 1-3 bytes in length and may indicate the length of the underling binary partition key. Length of a partition key of up to 4 MB fits in 3 bytes with the first 2 bits of the first length byte containing information about the number of length bytes. Length values of 1-63 would be represented using a single byte with the leading 2 bits being 01, length values of 64-16383 would use 2 bytes with the leading 2 bits of the first byte being 10 and length values of 16384-4194303 would use 3 bytes with the leading 2 bits of the first byte being 11.

This may be represented by receiving a number of partition keys 502, 504, 506 and converting them, at operation 508 to binary partition keys and adding length information to each key to result in length information 510 being added to binary partition key 512, length information 514 being added to binary partition key 516, and length information 58 being added to binary partition key 520.

Each encoded partition key may then be concatenated or combined and a hash operation, such as MD5 or other suitable hashing operation or function, may be performed on the concatenated encoded partition keys to produce a hash of the compound partition key. The resultant hash value may be stored on disk as a fixed size binary(16) as one part of a index primary key associated with a data table to be stored in the key value database. These operations may be represented by length information 510 and binary partition key 512, length information 514 and binary partition key 516, and length information 518 being added to binary partition key 520 being concatenated together at operation 522 and the result hashed, at operation 524, to produce a hash of the compound partition key 526.

An alternative encoding scheme may include concatenating the hashes of each individual partition key and computing the overall hash of the concatenated hashes. It should be appreciated, that in some scenarios, this alternative may require greater resources to perform the additional hashing functions and so may impact performance.

Figure 6:
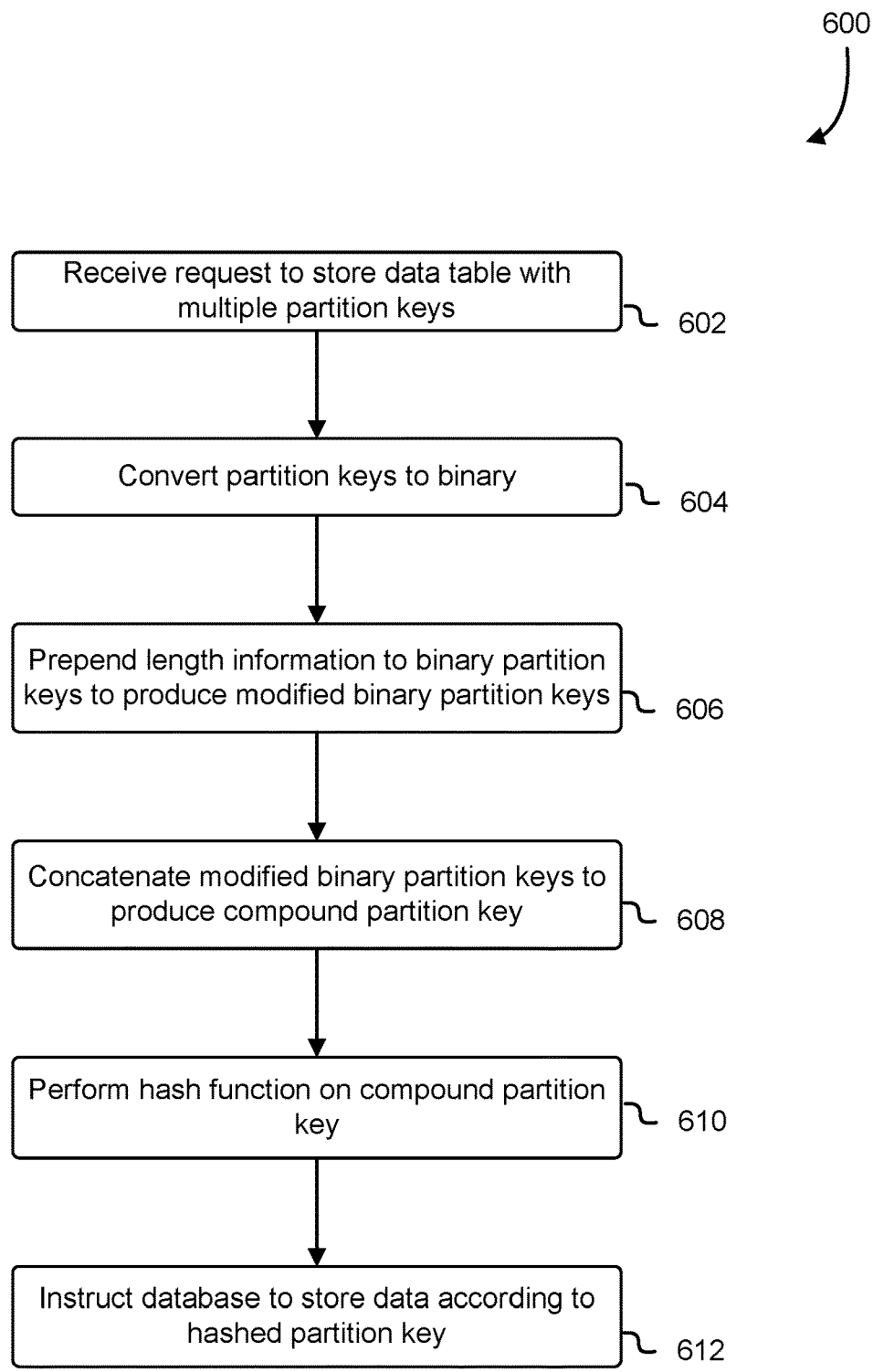
FIG. 6 illustrates another example process of generating a compound partition key, in accordance with at least one embodiment.

FIG. 6 illustrates another example process 600 of generating a compound partition key, in accordance with at least one embodiment. Process 600 may be performed by compound key generator 114 or partition key generator 206 as described above in reference to FIGS. 1 and 2, and/or may include two or more partition keys, as described above in reference to FIG. 3. Process 600 may also track or generate the keys and components described above with respect to FIG. 5, as will be apparent by similar terminology.

Another example of generating a compound partition key will be described in detail below. A table may be specified with two partition keys P1 and P2, which may be plain text partition keys. These keys may be received, at operation 602, with or as part of a request to store data, such as a data table, using multiple partition keys in a database, such as a key-value database. An example of plain text partition keys is as follows:

| P1 | P2 |
|----|----|
| ab | c  |
| a  | bc |

The plain text partition keys may then be encoded to an equivalent binary representation, at operation 604, to yield:

| P1 | P2 |
|----|----|
| 01100001 01100010 | 01100011 |
| 01100001 | 01100010 01100011 |

It should be appreciated that in other cases, other types may be supported, such as Hex, or other type, where operation 604 may be omitted or modified to convert to the desired format. The binary partition keys may each be prepended (or appended in alternative implementations) with length information, at operation 606, represented in this example, by:

| P1 | P2 |
|----|----|
| 01000010 01100001 01100010 | 01000001 01100011 |
| 01000001 01100001 | 01000010 01100010 01100011 |

The encoded partition keys may then be concatenated together, at operation 608, to produce compound partition keys:

| P1 encoded + P2 encoded |
|---|
| 01000010 01100001 01100010 01000001 01100011 |
| 01000001 01100001 01000010 01100010 01100011 |

The concatenated partition keys may then be hashed, such as using MD5 hashing, or other suitable hashing, at operation 610, to produce the following hashes:

| MD5(P1 encoded + P2 encoded) |
|---|
| CB2D7E32CA8A4108D297A1E281A69ECC |
| E616353242543657890B0062705171BD |

The hashes may then be used as key values to store data in a key value database, at operation 612, such as those described above. In some cases, the compound partition keys may be of a fixed or predetermined length to facilitate consistent encoding, deciphering, and use of the partition keys to store and access data. It should also be appreciated that a single partition key with length information will also operate within this encoding scheme, and be read in a similar manner.

Figure 7:
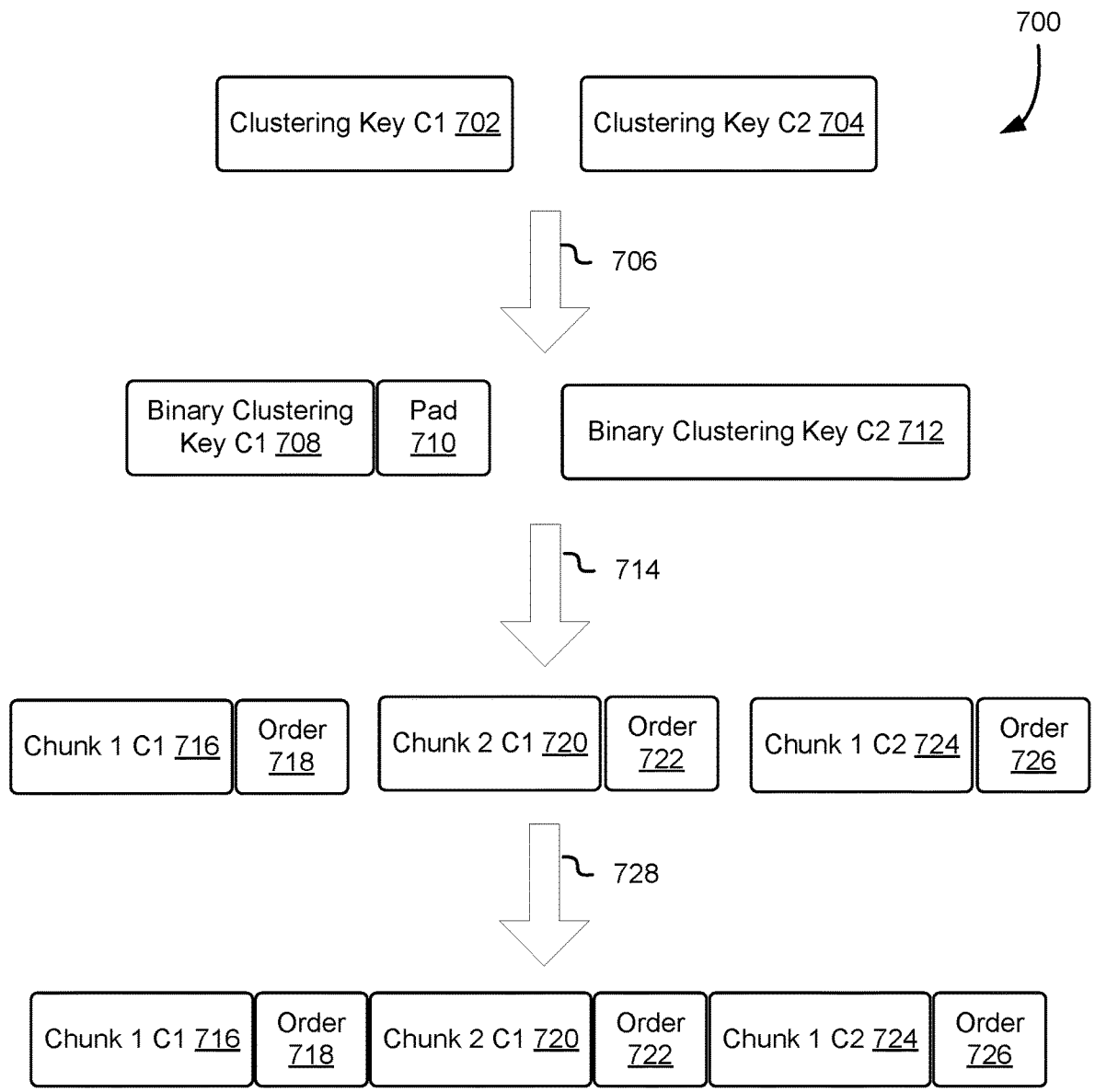
FIG. 7 illustrates an example process of generating a compound clustering key, in accordance with at least one embodiment.

FIG. 7 illustrates an example process 700 of generating a compound clustering key, in accordance with at least one embodiment. Process 700 may be performed by compound key generator 114 or clustering key generator 208 as described above in reference to FIGS. 1 and 2, and/or may include two or more clustering keys, as described above in reference to FIG. 4.

An arbitrary positive integer N<255 may be used as part of the encoding algorithm. In other examples, arbitrary numbers may selected from a different range, such that may be smaller or larger. Each clustering key will go through the following steps for encoding.

Two or more clustering keys C1 702 and C2 704, including plaintext or alphanumeric characters, may be received. The clustering keys 702 and 704 may each be encoded or converted to a binary representation 718, 712, for example, using existing encoding schemes for scalar types. In some aspects, one or more binary clustering keys 708 may be padded with a set value, such as bytes of value 0x00 or some other identifiable and consistent value set, to make the key's size equal to the nearest multiple of N. In some cases, if the clustering keys are a multiple of N already, or in other cases, padding may not be necessary, such as in the case of key 712. Padding may be performed to ensure that all the binary keys are of a length that can be split into chunks having a size of N. This may be represented by operation 706, in which clustering keys 702 and 704 may be converted to binary and padded, if necessary, to yield binary clustering key 708 with padding 710, and binary clustering key 712 (without padding, as it may have already been of a length that is a multiple of N).

The padded (or unpadded) binary keys may then be divided into chunks or portions of a size of N. Ordering information may then be added to the individual chunks. For example, starting from the first chunk, if that chunk is not the last chunk, continuation metadata byte 0xFF (11111111) may be appended or added to the chunk. Foer every chunk that is not the last chunk, the same metadata may be added to that chunk. For the last or terminal chunk of the key, a termination metadata byte that indicates the number of non-padded bytes in the chunk may be added or appended to the chunk. This may be represented by operation 714, yielding C1 being split into chunk 1 716 with order information 718 added (either at the end or the beginning of the chunk) and chunk 2 720 with order information 722 added; and C2 being a single chunk 724 with order information 726, which may be different than order information 718 and 722, and may indicate the number of non-padded bytes in the chunk.

Each clustering key encoded as above is guaranteed to preserve lexicographical (unsigned byte comparison) order. For reverse lexicographical order, the value may be encoded as described above, with the change that the bits will be complemented.

Each encoded clustering key value may then be concatenated, at operation 728, and stored on disk as a single variable length value as part of an index primary key used to store, sort, and access data. In some examples, the concatenated compound clustering key may be stored as a varbinary(1024) as one part of an index primary key.

In one specific example, each compound clustering key may include 1-2 bytes for attribute name (key id), 1 byte for attribute type and up to 40 bytes for attribute value.

Figure 8:
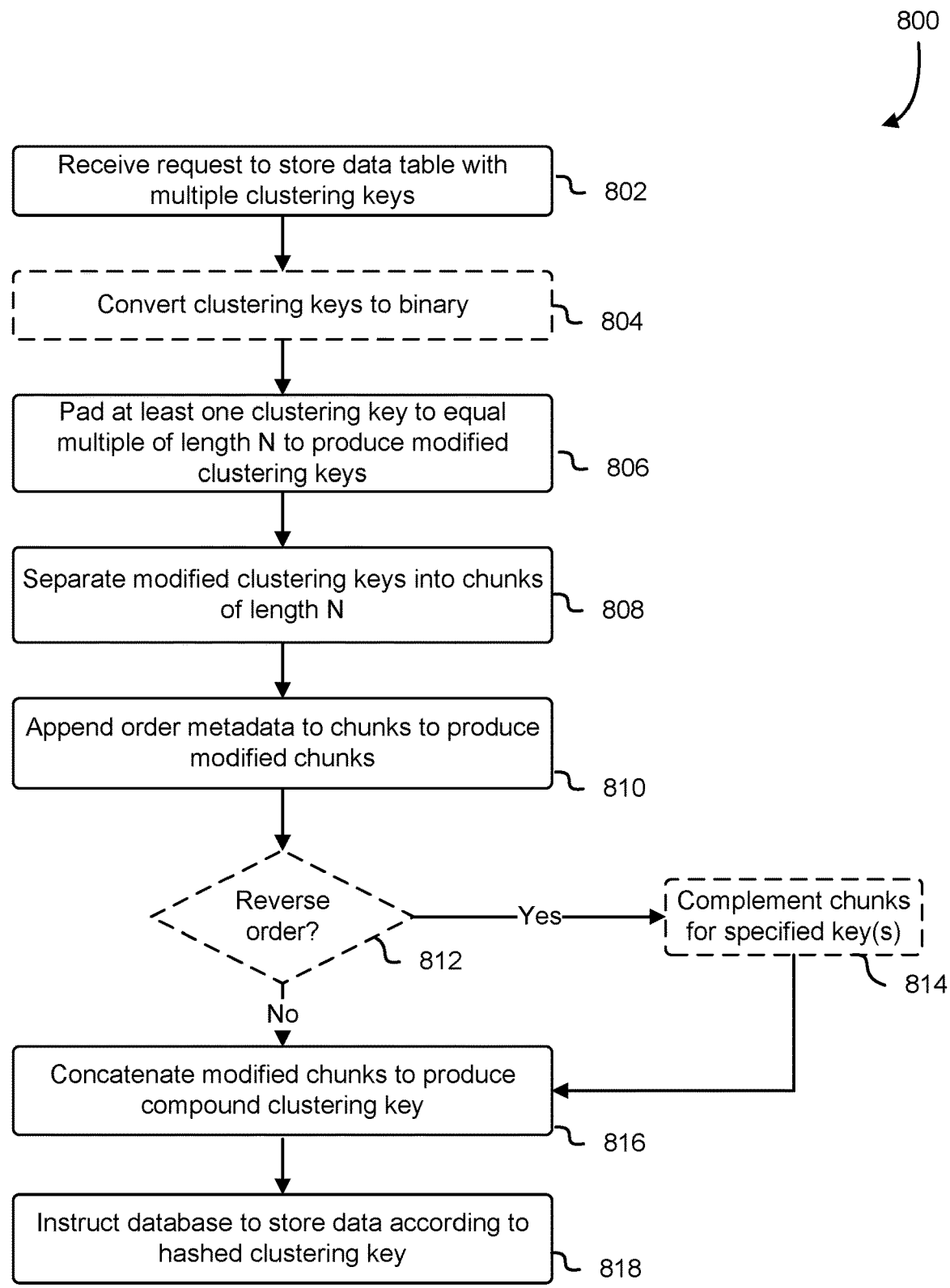
FIG. 8 illustrates another example process of generating a compound clustering key, in accordance with at least one embodiment.

FIG. 8 illustrates another example process 800 of generating a compound clustering key, in accordance with at least one embodiment. Process 800 may be performed by compound key generator 114 or clustering key generator 208 as described above in reference to FIGS. 1 and 2, and/or may include two or more clustering keys, as described above in reference to FIG. 5. Process 800 may also track or generate the keys and components described above with respect to FIG. 7, as will be apparent by similar terminology.

Another example of generating a compound clustering or range key will be described in detail below. A table may be configured with two range or clustering keys R1 (ascending) and R2 (ascending) as indicated below. The range or clustering keys may be plain text or some other format or type. Two or more clustering keys may be received at operation 802, with a request to store or sort data in a data table

| R1 | R2 |
|---|---|
| abc | d |
| abc | dd |
| ab | cd |

For this example, assume arbitrary number, N=2. Each key may then be converted or encoded to an equivalent binary representation, at operation 804, to yield:

| R1 | R2 |
|---|---|
| 01100001 01100010 01100011 | 01100100 |
| 01100001 01100010 01100011 | 01100100 01100100 |
| 01100001 01100010 | 01100011 01100100 |

It should be appreciated that in other cases, other types may be supported, such as Hex, or other type, where operation 804 may be omitted or modified to convert to the desired format. Next, at operation 806, one or more of the keys may be padded, as necessary, such that each key is equal to a multiple or N. This may be represented by operation 806, and may yield the following in the provided example:

| R1 | R2 |
|---|---|
| 01100001 01100010 01100011 00000000 | 01100100 00000000 |
| 01100001 01100010 01100011 00000000 | 01100100 01100100 |
| 01100001 01100010 | 01100011 01100100 |

Next, at operation 808, the encoded values may be divided into chunks of N bytes each (some keys may only be one chunk). Next, at operation 810 metadata (a number of bytes) indicting ordering of the chunks may be appended to each chunk, to yield the following:

| R1 - chunk 1 |
|---|
| 01100001 01100010 11111111 |
| 01100001 01100010 11111111 |
| 01100001 01100010 00000010 |
| R1 - chunk 2 |
| 01100011 00000000 00000001 |
| 01100011 00000000 00000001 |
| R2 - chunk 1 |
| 01100100 00000000 00000001 |
| 01100100 01100100 00000010 |
| 01100011 01100100 00000010 |

The modified chunks may then be concatenated together to produce a compound clustering key, at operation 816, to yield:

| Key | R1 encoded + R2 encoded |
|---|---|
| ab, cd | 01100001 01100010 00000010 01100011 01100100 00000010 |
| abc, d | 01100001 01100010 11111111 01100011 00000000 00000001 01100100 00000000 00000001 |
| abc, dd | 01100001 01100010 11111111 01100011 00000000 00000001 01100100 01100100 00000010 |

As indicated in the above example, a byte by byte comparison will sort <ab, cd> before <abc, d> before <abc, dd>.

In some examples, ordering of the sort order may be changed, such that R1 may be ascending, and R2 descending. This may be accomplished by determining the complement of the chunks for the descending field R2. This may be represented by optional operations 812 and 814, and may yield the following chunks:

| R1 - chunk 1 |
|---|
| 01100001 01100010 11111111 |
| 01100001 01100010 11111111 |
| 01100001 01100010 00000010 |
| R1 - chunk 2 |
| 01100011 00000000 00000001 |
| 01100011 00000000 00000001 |
| R2 - chunk 1 complement |
| 10011011 11111111 11111110 |
| 10011011 10011011 11111101 |
| 10011100 10011011 11111101 |

These modified chunks may then be concatenated together, at operation 816 to yield:

| Key | R1 encoded + R2 encoded |
|---|---|
| ab, cd | 01100001 01100010 00000010 10011100 10011011 11111101 |
| abc, dd | 01100001 01100010 11111111 01100011 00000000 00000001 10011011 10011011 11111101 |
| abc, d | 01100001 01100010 11111111 01100011 00000000 00000001 10011011 11111111 11111110 |

It is clear from the above example that a byte by byte comparison will a sort <ab, cd> before <abc, dd> before <abc, d> thereby maintaining ascending order on R1 followed by descending order on R2.

In either the ascending or descending examples, or a combination thereof, the database may then store, sort, and/or access data using the compound clustering key, at operation 818.

It should also be appreciated that a single clustering key, encoded using the example processes above, will also operate within this encoding scheme, and be read in a similar manner without other changes to existing database processes.

Figure 9:
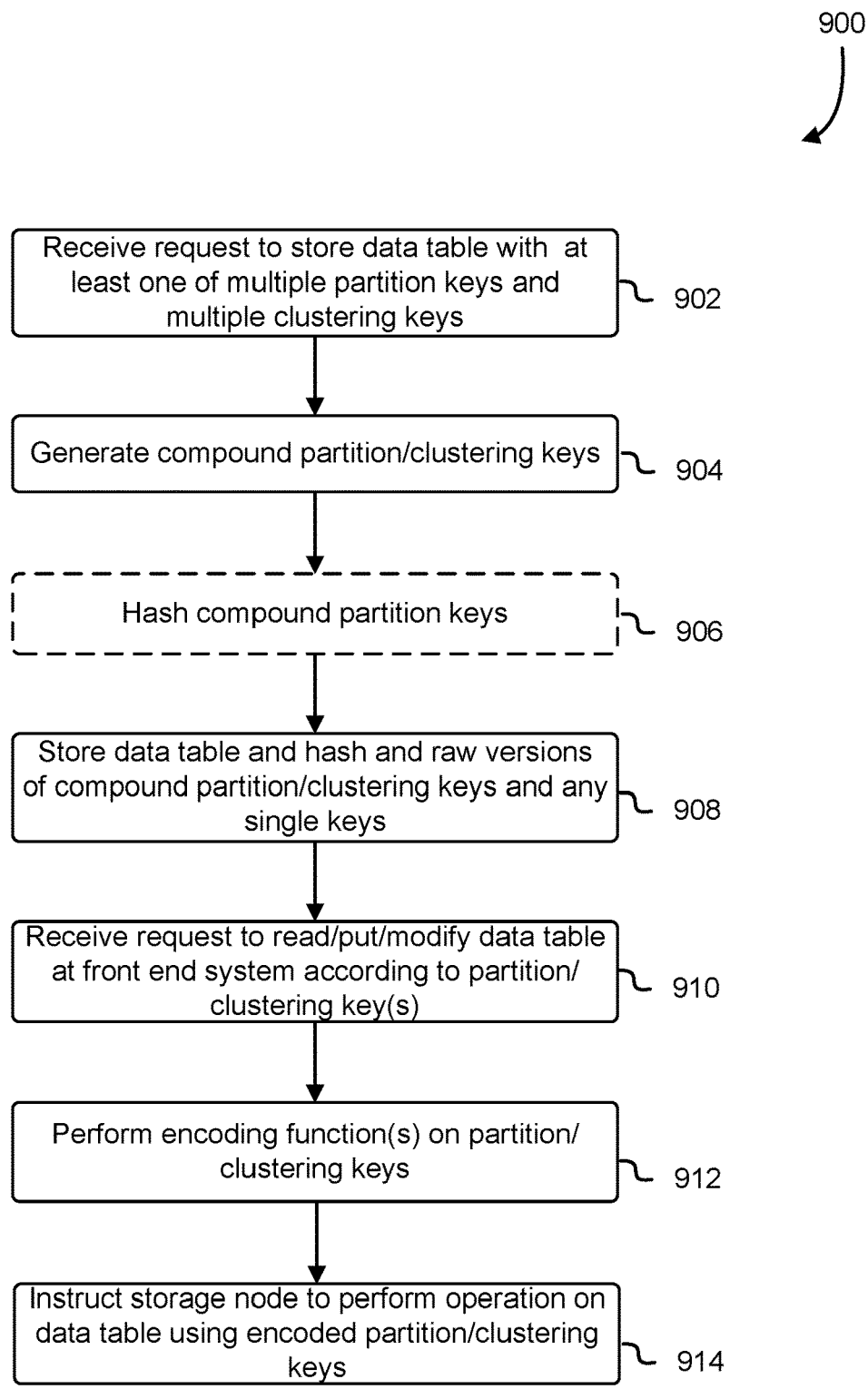
FIG. 9 illustrates an example process for accessing data using at least one of a compound partition key or compound clustering key, in accordance with at least one embodiment.

FIG. 9 illustrates an example process 900 for accessing data using at least one of a compound partition key or compound clustering key, in accordance with at least one embodiment. Process 900 may be performed at least in part by query processing subsystem 106, 202 compound key generator 114, 204 storage subsystem 108, control plane 110, partition key generator 206, clustering key generator 208, and/or key-value engine 212 as described above in reference to FIGS. 1 and 2, and/or may utilize aspects of process 500, 600, 700, and/or 800 described in reference to FIGS. 5-8.

Process 902 may begin at operation 902, where a request to store data in a table with at least one compound partition key or clustering key may be received. Responsive to the request, a compound partition key, a compound clustering key, or a combination thereof may be generated at operation 904. In some aspects, operation 904 may include one or more aspects of applicable processes 500-800 described above. In some examples, hashes of the compound partition key may be generated, at operation 906. The data may then be stored in a table according to the compound key or keys, such as in a key-value database system as described above, at operation 908. In some aspects, the raw version of the keys (e.g., un-hashed, or unmodified) may be stored in one or more storage nodes of the database system. In some aspects, storing the raw key values may avoid filtering projection expressions on the front end, may avoid filtering results on the front end for conditional reads, may avoid two phase protocol for conditional writes on the front end, and/or may require less modifications for other systems (i.e. streams). Storing raw key values may also reduce risk of losing data in case there is an error in encoding function.

At a later time, at operation 910, a request to read, put, or modify data stored in the data table via identification of one or more partition keys, clustering keys, or both may be received by a front end of the database system, as described in greater detail above. The front end may then perform one or more encoding functions on the supplied keys to generate compound keys, as used to store the actual data, at operation 912.

Once the keys have been encoded or converted to the compound keys, the data may then be accessed from the database system according to compound key or keys and the requested operation performed on the data, at operation 914.

In some cases, encoding the keys into compound keys may include using encoding functions f( ) and g( ) for composite partition or hash and clustering or range key. In one example, assume "a" and "b" are parts of composite partition key and "c" and "d" are parts of composite clustering key, then the storage node will store the following:

Hash function($f(a,b)$),$f(a,b)$,$g(c,d)$,$a,b,c,d$, other_attributes.

In some aspects, the storage node may store the hash (e.g., MD5 hash) value and raw hash value). F(a, b) and g(c, d) values may be determined on the front end system. When stored on the storage node, the user table from the front end may looks like a regular Partition-Clustering or Hash-Range table with f(a, b) value being the partition key and g(c, b) being clustering key. In some cases, if there is no clustering key, then only f( ) encoding function is used and for the storage node, the table looks like a regular hash-only table. In the examples where raw key values are stored, there may be no need to decode f(a, b) value.

The front end may encode single or compound partition and clustering keys. This may simplify logic (no if conditions) and design, such that all keys may have the same type. In some cases, the front end may use binary type for all partition and clustering keys, such that functions f( ) and g( ) return binary results. This may also simplify the control plane design, such that the actual key types do not need to be known at the time of table creation.

In some cases, attribute names may be specified for synthetic partition and clustering keys. In some aspects, the front end may convert user provided attribute names into internal format which allows 0-9, a-z, and A-Z characters. The new attribute names may be specified to not intersect with internal format namespaces.

In some aspects, for read requests, the front end may calculate f( ) and g( ) values and retrieves data based on that from the storage node. If only first part(s) of composite clustering or range key is specified, then the go function may still be used. For example, if c and d are parts of composite clustering key in that order, and a request includes a fully specified partition key and a condition c>8, then the g( ) encoding function would still be used. For put or store requests, the front end may calculate f( ) and g( ) values and pass those values to the storage node along with raw key values and non-key attributes. In the example of update request, the request may be implicitly conditioned on the key attributes. If the item specified in the request exists, an update is performed. If the item does not exist, the storage node may perform insert.

In some cases, to account for the possibility of collision of f( ) function values, such as when f(a,b)=f(c, d)), reversible encoding may be utilized, as described above. In other cases irreversible encoding may be utilized to reduce storage costs for larger keys. However, the use of irreversible encoding may result in undetectable collisions, such that the storage node cannot determine when a collision will occur. An example of irreversible encoding may include:

$$f(k1,k2,\ldots,kn)=md5(k1)+md5(k2)+\ldots+md5(kn)$$

Figure 10:
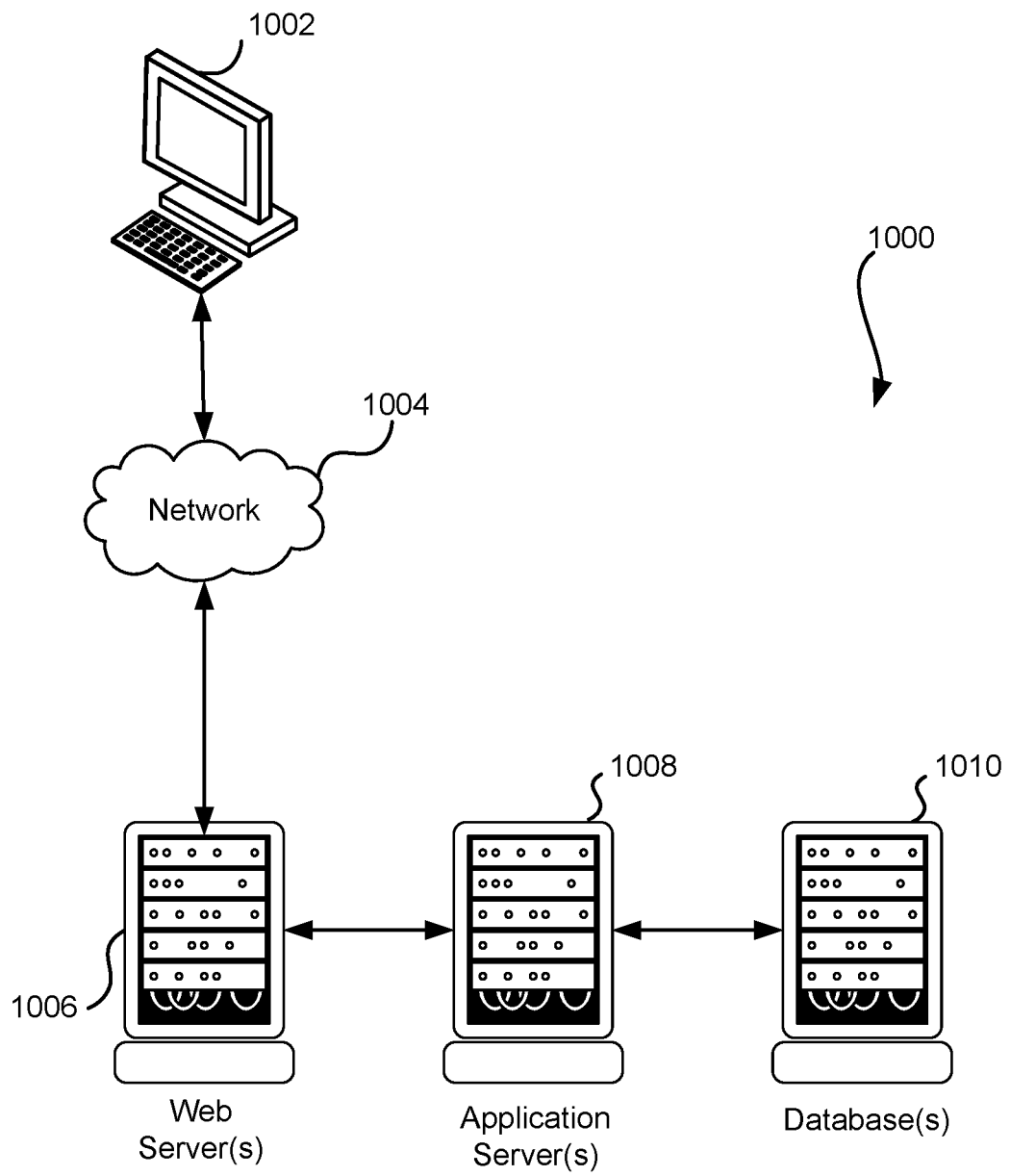
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system comprising
   a front end host comprising a customer interface;
   a data storage service accessible via the front end host, wherein the data storage service comprises a plurality of nodes of a table-oriented database, and wherein the front end host includes instructions that as a result of being executed by the system, cause the system to:
      receive a request to store data in a data table with the data storage service, wherein the request specifies a compound clustering key comprising at least two key values;
      generate a compound clustering key for the data by:
         padding each of the key values to produce padded key values that have a length that is a multiple of an arbitrary number;
         dividing the padded key values into a number of chunks having a size equal to the arbitrary number;
         appending metadata to each of the number of chunks to produce modified chunks, wherein the metadata indicates an order of individual chunks of the number of chunks; and
         concatenating the modified chunks together; and
      cause the data to be stored in the data table with the data storage service according to the compound clustering key.

2. The system of claim 1, wherein the request specifies a compound partition key comprising at least two partition values, and wherein the instructions that as a result of being executed by the system, further cause the system to:
   generate a compound partition key for the data by:
      converting each of the at least two partition values to binary partition values;
      adding metadata to each of the binary partition values to produce modified partition values, wherein the metadata indicates a length of individual binary partition values of the binary partition values; and
      concatenate the modified partition values together to generate the compound partition key; and
   cause the data of the data table to be stored by a node of the plurality of nodes of the data storage service according to the compound partition key and the compound clustering key.

3. The system of claim 1, wherein the instructions that as a result of being executed by the system, further cause the system to:
   append first metadata to at least a beginning chunk of the number of chunks; and
   append second metadata to the last chunk of the number of chunks, the second metadata indicating a number of non-padded bytes in the chunk.

4. The system of claim 1, wherein the instructions that as a result of being executed by the system, further cause the system to:
   receive a request to perform an operation on the data of the data table, the response specifying at least one of the at least two keys values;
   responsive to receiving the request, encode the at least one of the at least two key values to generate an access key, the access key comprising at least part of the compound clustering key; and
   instruct a node of the plurality of nodes of the data storage service to perform the operation on the data of the data table using the access key.

5. A computer-implemented method comprising:
   receiving a request to store data in a data table with a data storage service, wherein the request specifies a compound partition key comprising at least two partition key values and a compound clustering key comprising at least two clustering key values;
   concatenating the at least two partition key values together to generate the compound partition key;
   generating a compound clustering key for the data by:
      appending metadata to each of the at least two clustering key values to produce at least two modified clustering key values, wherein the metadata preserves an order of portions of the at least two clustering keys; and
      concatenating the at least two modified clustering key values together; and
   causing the data to be stored in the data table with the data storage service according to the compound partition key and the compound clustering key.

6. The computer-implemented method of claim 5, wherein generating the compound clustering key further comprises dividing the at least two clustering key values into a number of chunks having a uniform length.

7. The computer-implemented method of claim 6, wherein generating the compound clustering key further comprises generating a complement of at least one of the number of chunks to produce reverse order chunks responsive to an instruction to store or access at least part of the data in reverse sort order.

8. The computer-implemented method of claim 5, wherein generating the compound clustering key further comprises:
   padding each of the at least two clustering key values to produce padded clustering key values that have a length that is a multiple of an arbitrary number; and
   dividing the padded clustering key values into a number of chunks having a size equal to the arbitrary number.

9. The computer-implemented method of claim 8, wherein appending the metadata to each of the at least two clustering key values further comprises:
   appending first metadata to at least a beginning chunk of the number of chunks; and
   appending second metadata to the last chunk of the number of chunks, the second metadata indicating a terminal chunk.

10. The computer-implemented method of claim 5, further comprising:
    appending length metadata to each of the at least two partition key values to produce modified partition key values, wherein the length metadata indicates a length of individual partition key values of the at least two partition key values; and
    concatenating the modified partition key values to generate the compound partition key.

11. The computer-implemented method of claim 5, further comprising:
    performing a hash function on the compound partition key to generated a hashed compound partition key; and
    causing the data to be stored in the data table with the data storage service according to the hashed compound partition key and the compound clustering key.

12. The computer-implemented method of claim 5, wherein the compound partition key has a predefined length.

13. A non-transitory computer-readable storage medium storing thereon executable instructions that, as a result of being executed by one or more processors of a computer system, cause the computer system to at least:
    receive a request to store data in a data table with a data storage service, wherein the request specifies a compound clustering key comprising at least two key values;
    generate a compound clustering key for the data by:
       dividing the key values into a number of chunks having a size equal to an arbitrary number; and
       appending metadata to each of the number of chunks to produce modified chunks, wherein the metadata indicates an order of individual chunks of the number of chunks; and
       concatenating the modified chunks together; and
    cause the data to be stored in the data table with the data storage service according to the compound clustering key.

14. The non-transitory computer-readable storage medium of claim 13, wherein the request specifies a partition key, and wherein the instructions that, as a result of being executed by the one or more processors, further cause the computer system to:
    causing the data of the data table to be stored with the data storage service according to the partition key and the compound clustering key.

15. The non-transitory computer-readable storage medium of claim 13, wherein the request specifies a compound partition key comprising at least two partition values, and wherein the instructions that, as a result of being executed by the one or more processors, further cause the computer system to:
    generate a compound partition key for the data by:
       converting each of the at least two partition values to binary partition values;
       prepending metadata to each of the binary partition values to produce modified partition values, wherein the metadata indicates a length of individual binary partition values of the binary partition values; and
       concatenating the modified partition values together to generate the compound partition key; and
    cause the data of the data table to be stored with the data storage service according to the compound partition key and the compound clustering key.

16. The non-transitory computer-readable storage medium of claim 13, further comprising:
    converting each of the at least two key values to binary key values; and
    padding each of the key values to produce padded key values that are a multiple of the arbitrary number prior to dividing the key values into the number of chunks.

17. The non-transitory computer-readable storage medium of claim 13, wherein the instructions that, as a result of being executed by the one or more processors, further cause the computer system to generate a compliment of at least one of the modified chunks to produce reverse order modified chunks responsive to an instruction to store at least one of the key values in reverse order.

18. The non-transitory computer-readable storage medium of claim 13, wherein the instructions that, as a result of being executed by the one or more processors, further cause the computer system to:
    append first metadata to at least a beginning chunk of the number of chunks; and
    append second metadata to the last chunk of the number of chunks, the second metadata indicating a number of non-padded bytes in the chunk.

19. The non-transitory computer-readable storage medium of claim 13, wherein the instructions that, as a result of being executed by the one or more processors, further cause the computer system to append first metadata to the last chunk of the number of chunks, the first metadata indicating a terminating chunk.

20. The non-transitory computer-readable storage medium of claim 13, wherein the instructions that, as a result of being executed by the one or more processors, further cause the computer system to:
    receive a request to perform an operation on the data of the data table, the response specifying at least one of the at least two keys values;
    responsive to receiving the request, encode the at least one of the at least two key values to generate an access key, the access key comprising at least part of the compound clustering key; and
    instruct a storage node of the data storage service to perform the operation on the data of the data table using the access key.

* * * * *